United States Patent [19]
Lamere et al.

[11] 4,272,956
[45] Jun. 16, 1981

[54] TIME DELAY DEVICE FOR DEPLOYABLE ROCKET NOZZLE SKIRTS

[75] Inventors: Garland C. Lamere; Frank S. Inman; Ronald B. Mitchell, all of Brigham City, Utah

[73] Assignee: Thiokol Corporation, Newtown, Pa.

[21] Appl. No.: 5,536

[22] Filed: Jan. 22, 1979

[51] Int. Cl.³ .................................................. F02K 1/24
[52] U.S. Cl. ........................................ 60/242; 60/271; 239/265.15
[58] Field of Search ............................... 60/271, 242; 239/265.15, 265.33, 265.43

[56] References Cited
U.S. PATENT DOCUMENTS

| 3,776,466 | 12/1973 | Ray | 60/200 A |
| 4,125,224 | 11/1978 | Carey | 239/265.43 |

Primary Examiner—Robert E. Garrett
Attorney, Agent, or Firm—William R. Wright, Jr.

[57] ABSTRACT

A rocket motor expansion cone extension skirt of the combustion gas deployable type is purposely delayed in its deployment by an erodable barrier in the motor's expansion cone upstream of the extension and which diverts combustion gas away from the skirt to prevent its deployment. The barrier is eroded away by the gases after a brief predetermined period of time long enough to permit the rocket motor to clear other structures in a situation such as may occur during vehicle stage separation, after which time deployment of the skirt occurs.

9 Claims, 3 Drawing Figures

TIME DELAY DEVICE FOR DEPLOYABLE ROCKET NOZZLE SKIRTS

The United States Government has rights in this invention pursuant to contract number F04611-75-C-0048 awarded by the U.S. Air Force.

BACKGROUND OF THE INVENTION AND DISCUSSION OF THE PRIOR ART

One of the problems associated with rocket powered vehicles is the extent of the space envelope required to store the rocket motor with its usually large and awkward to store expansion cone. A way to shorten the cone and to decrease its diameter for storage has been devised, however, and is available in the form of a skirt attached to the exit rim of the motor's expansion cone but which can be folded into the motor's open end to decrease the expansion cone's dimensions considerably. Folding expansion cones of various sorts are known in the rocket motor art as is shown, for instance, in U.S. Pat. No. 4,125,224 to Lee F. Carey which shows an extendible and expansible pleat-folded skirt.

A particular problem exists in such devices, however, in that they operate so quickly upon ignition of the motor that interference of the skirt may occur with surrounding structure, for instance, in the event of stage separation in a multi-stage rocket system where the skirt may hit upon the separating stage before it is entirely clear of the first stage and possibly cause damage to the skirt or to other parts with resulting loss of performance or malfunction. The present invention solves this problem by including a liner or barrier of ablative or sacrificial material within the expansion cone of the rocket motor ahead of the folded deployable skirt which serves to block the flow of combustion gases to the skirt until the barrier has been eroded away. With the barrier thus removed, the skirt is acted upon by the gases and becomes deployed but only after the period of time required for barrier consumption has expired, thus giving time for the rocket stages to separate sufficiently to avoid interference.

OBJECTS OF THE INVENTION

Accordingly, it is an object of the present invention to provide a device for delaying deployment of a rocket motor nozzle expansion cone extension skirt in order to eliminate the possibility of interference with nearby parts of the rocket vehicle during stage separation.

It is also an object of the present invention to provide a barrier of the foregoing type wherein the barrier material is completely sacrificial in character.

It is also an object of the present invention to provide a barrier of the foregoing type wherein the barrier is constructed entirely of ablative material.

It is also an object of the present invention to provide a barrier of the foregoing type wherein the barrier is of composite material with a sacrificial material forming a base but with an ablative surface.

Other objects and advantages of the present invention will be apparent from the detailed description and claims which follow hereinafter.

DETAILED DESCRIPTION AND OPERATION

Figure 1:
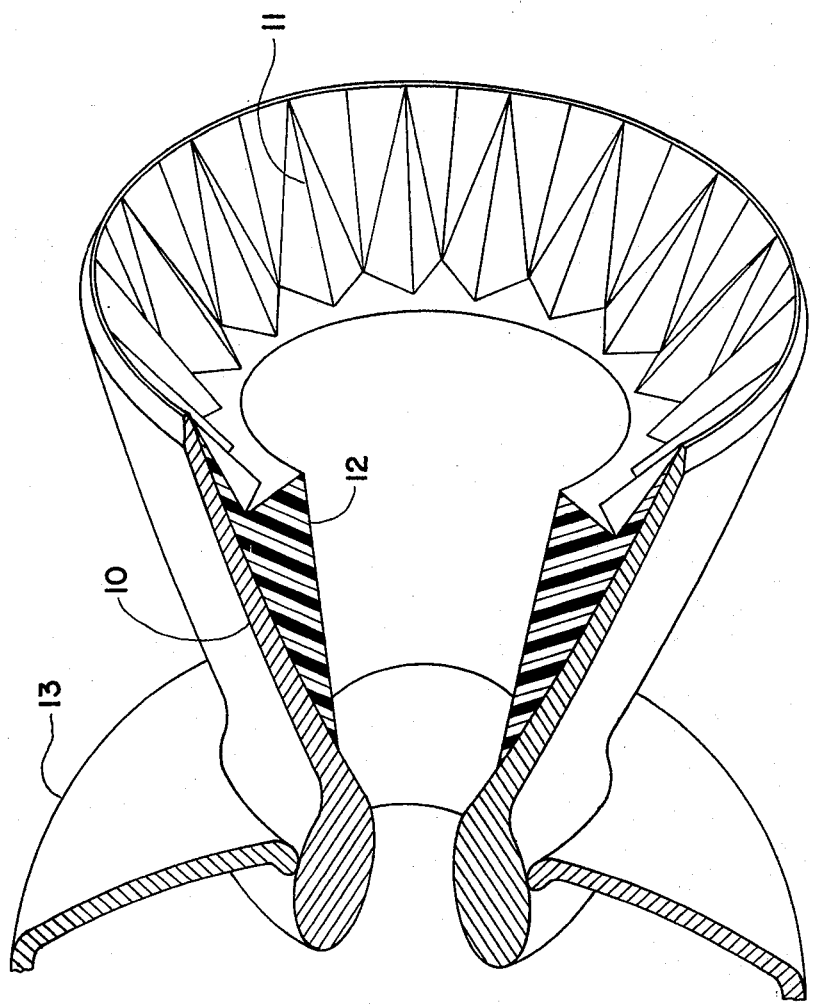
FIG. 1 is a partially cutaway perspective view showing the skirt in stowed position behind the sacrificial liner in a rocket motor nozzle before operation of the motor.

A rocket motor nozzle 10 is shown in FIG. 1 having a deployable nozzle skirt 11 which comprises a thin material hinged at the outer periphery of the nozzle 10 and capable of being folded into pleats so that the whole skirt can be folded back into the nozzle in the manner shown until it touches, or is immediately adjacent to, a liner or barrier 12. The barrier 12 is constructed of a sacrificial or ablative material, or a composite thereof as explained later, which will be eroded or consumed by the outrushing hot combustion gases of the rocket motor as they pass through the nozzle. This barrier 12 is bonded to the inside of the rocket nozzle cone and is deeper at the after or open end of the nozzle 10 than the maximum height of the pleats of the folded skirt 11 so that combustion gases emanating from the rocket motor 13 will not be intercepted by the pleats of skirt 11 and will remain in the folded condition until such time as the barrier has been removed, that is, consumed or eroded. In this way, a time lag is provided after motor combustion has started and before deployment of the skirt 11 can occur, thus preventing deployment of skirt 11 before sufficient clearance has been achieved during separation of the rocket stages. The exact period of time lag can be determined by the amount and type of material used in the construction of the barrier 12. For instance, a barrier made of close-celled Styrofoam can be expected to last from about 40 to 50 milliseconds if installed in the manner shown in FIG. 1, and, since only about 20 milliseconds is usually needed for sufficient clearance to develop, this would be an adequate deployment delay time.

Figure 2:
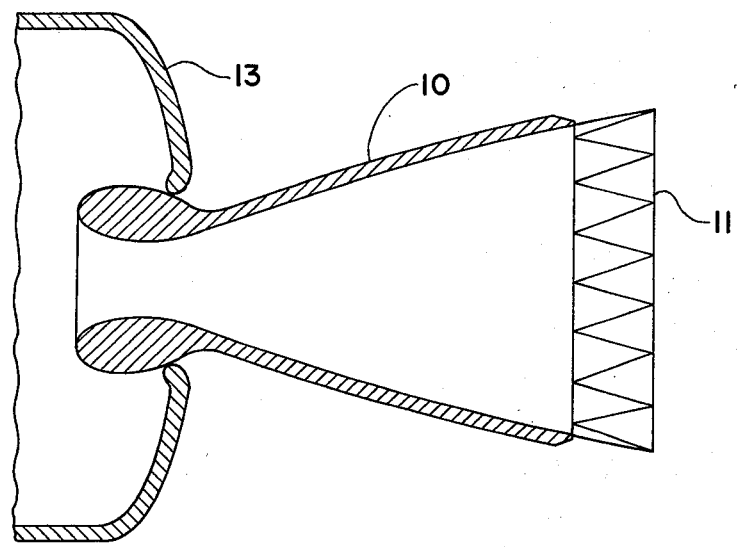
FIG. 2 is a cross sectional view of the rocket motor nozzle showing that the sacrificial liner has been completely eroded or consumed and the skirt has been fully deployed.

In a preferred embodiment of the invention, the skirt 11 can be constructed of thin high temperature resistant metal or other suitable material clamped or crimped about the outer periphery of the nozzle 10 and folded back in pleats. When opened, the pleats provide sufficient material to afford a frusto-conical surface extension substantially in line with the expansion cone of the original nozzle as shown in FIG. 2.

In operation, the nozzle 10 is made ready with the skirt 11 folded into the nozzle 10 and with the sacrificial barrier 12 in place in the nozzle 10 immediately forward (upstream) of skirt 11 and preferably in contact with it. The rocket motor and nozzle 10 are then assembled into a rocket vehicle staged system with the nozzle 10 adjacent the next stage portion of the vehicle in such close priximity to it that the skirt 11 would interfere with the next stage portion if it were deployed. Such a compact arrangement is not unusual in staged rocket vehicles.

The rocket motor is then fired, upon which action combustion gases are formed and the stage to which the motor and nozzle 10 are attached is detached from the next stage. Combustion gases then flow through the nozzle 10 and cause the stages to separate. The gases flow across the material of barrier 12 and are diverted from the skirt 11 so that it will not be lifted by the gases and unfolded to its deployed position. The material, however, starts to erode and is entirely consumed or removed by the heat and erosion of the flowing gases after a predetermined time interval which is just long enough to allow clearance between the skirt 11 and the next stage. The skirt 11 is then lifted by the gases and becomes fully deployed without interference with any part of the next stage of the rocket motor.

Figure 3:
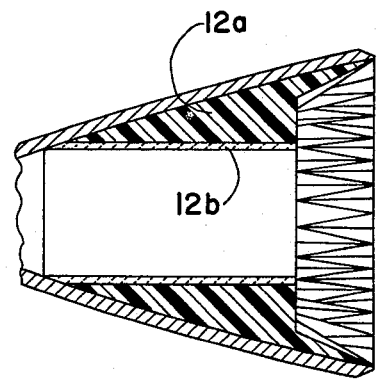
FIG. 3 is a partial cross section of the nozzle showing a composite construction of the barrier.

The liner or barrier 12 can be made of a lightweight but relatively solid material such as close-celled Styrofoam, can be made of a more solid material such as phenolic if the weight can be tolerated or as a composite having an ablative inner face or layer of phenolic or other relatively hard ablative material 12b bonded on the Styrofoam 12a as shows in FIG. 3 which would cause overall slower erosion of the barrier because of the slower erosion of the ablative material and thus lengthen the deployment delay period. While both the sacrificial and ablative materials do erode repidly, a distinction is made here between fast eroding material such as Styrofoam and a slower eroding or ablative material such as a phenolic. Other materials can also be used, however, as long as they have sufficient erosion and heat resistant qualities to provide the required time lag and are either carried away or consumed quickly thereafter.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from and spirit of the invention. It is the intention, therefore to be limited only as indicated by the scope of the following claims.

What is claimed is:

1. A rocket motor having an expansion cone, a combustion gas deployable skirt for the expansion cone and a barrier blocking gas flow to said deployable skirt in its undeployed condition, means retaining said barrier in said expansion cone, and said barrier removed by the erosive action of the combustion gas after a predetermined time of operation of the motor has elapsed to unblock gas flow to said deployable skirt.

2. The invention set forth in claim 1 with the barrier comprising sacrificial material.

3. The invention set forth in claim 2 with the sacrificial material being close-celled Styrofoam.

4. The invention set forth in claim 2 with the sacrificial material being a phenolic.

5. The invention set forth in claim 1 with the barrier comprising a composite of both slow eroding and fast eroding sacrificial material.

6. The invention set forth in claim 5 with the slow eroding sacrificial material comprising a layer on the exterior of the fast eroding sacrificial material where it is exposed to the flow of combustion gases.

7. The invention set forth in claim 1 with the deployable skirt attached to the after end of the expansion cone and folded inwardly and forwardly substantially on the expansion cone's inner surface, and the barrier located on the expansion cone's inner surface forward of the deployable skirt.

8. The invention set forth in claim 7 with the barrier in the form of a truncated hollow cone with its larger end at the deployable skirt and with the skirt below the rim of the barrier.

9. The invention set forth in claim 1 with the barrier retained to the expansion cone by an adhesive bond.

* * * * *